(12) United States Patent
England (10) Patent No.: US 6,265,024 B1
(45) Date of Patent: Jul. 24, 2001

(54) FIBER FILTER AND METHODS OF USE THEREOF

(75) Inventor: William G. England, Suwanee, GA (US)

(73) Assignee: Purafil, Inc., Doraville, GA (US)

( * ) Notice: Subject to any disclaimer, the term of this patent is extended or adjusted under 35 U.S.C. 154(b) by 0 days.

(21) Appl. No.: 09/454,754

(22) Filed: Dec. 6, 1999

Related U.S. Application Data (62) Division of application No. 09/378,278, filed on Aug. 20, 1999, which is a division of application No. 08/378,807, filed on Jan. 27, 1995, now Pat. No. 5,942,323.

(51) Int. Cl.$^7$ .......................................................... B05D 3/02
(52) U.S. Cl. ........................ 427/203; 427/205; 427/407.3; 427/409; 427/412.1; 427/412.5
(58) Field of Search ............................ 55/524, 527, 528; 427/180, 202, 203, 205, 412.1, 412.5, 407.3, 409

(56) References Cited

U.S. PATENT DOCUMENTS

| | | |
|---|---|---|
| 2,981,771 | 4/1961 | Brant et al. . |
| 3,049,399 | 8/1962 | Gamson et al. . |
| 3,226,332 | 12/1965 | Lincoln et al. . |
| 3,391,988 | 7/1968 | Friess et al. ..................... 423/244.03 |
| 3,421,837 | 1/1969 | Ebel et al. . |
| 3,957,059 | 5/1976 | Rainer et al. . |
| 4,072,479 | 2/1978 | Sinha et al. ............................. 95/136 |
| 4,133,309 | 1/1979 | Kohler et al. . |
| 4,215,096 | 7/1980 | Sinha et al. .......................... 423/241 |
| 4,235,750 | 11/1980 | Cazalet . |
| 4,238,334 | 12/1980 | Halbfoster . |

(List continued on next page.)

FOREIGN PATENT DOCUMENTS

| | | |
|---|---|---|
| 1302872 | * 12/1970 | (DE) . |
| 2209564 | 9/1973 | (DE) . |
| 2 404 089 | 8/1974 | (DE) . |
| 1026904 | 4/1966 | (GB) . |
| 1029688 | 5/1966 | (GB) . |
| J5 7001-421 | 1/1982 | (JP) . |
| J6 3147-518 | 6/1988 | (JP) . |
| J0 3137-917 | 6/1991 | (JP) . |

OTHER PUBLICATIONS

"Conference Report", Borg Warner Corporation, Research Center of Des Plaines, Illinois, and Kaiser Aluminum and Chemical Corporation of Baton Rouge, Louisiana, dated Jan. 11, 1960.

Database WPI, Week 8907, Derwent Publications Ltd., London, GB; AN 89–049905 & JP A 01 005 552 (Kyodo Gold Pack KK) Jan. 10, 1989.

Database WPI, Week 9037, Derwent Publications Ltd., London, GB; AN 90–280142 & JP A 2 198 629 (Nakajima) Aug. 7, 1990.

Database WPI, Week 8507, Derwent Publications Ltd., London, GB; AN 85041469 & JP A 60 000 827 (Nippon Chem. Ind.) Jan. 5, 1985.

Brochure entitled "Ammonia–Lock Filters" from Quality Filters, Inc., with cover letter, dated Feb. 20, 1991.

Brochure for "OdorGuard Plus" dated Sep. 1991.

Primary Examiner—Erma Cameron
(74) Attorney, Agent, or Firm—Kilpatrick Stockton, LLP (57) ABSTRACT

A fiber filter, method of preparing the fiber filter, and method of treating a fluid stream with the fiber filter are disclosed. The fiber filter comprises an inert fiber matrix, water, and a substrate bound to the fiber matrix that is capable of oxidizing or neutralizing a contaminant. More specifically, the substrate bound to the fiber matrix is sodium bicarbonate, impregnated activated alumina, impregnated zeolite, or a mixture thereof. The impregnate is a permanganate salt, sodium bicarbonate, or a mixture thereof. Improved efficiency of removal of undesirable compounds such as hydrogen sulfide and sulfur dioxide from fluid streams is achieved.

7 Claims, 2 Drawing Sheets

U.S. PATENT DOCUMENTS

| | | |
|---|---|---|
| 4,273,751 | 6/1981 | Sinha et al. .................. 423/244.03 |
| 4,517,111 | 5/1985 | Dorman et al. . |
| 4,553,992 | 11/1985 | Boissinot et al. . |
| 4,637,408 | 1/1987 | Rainer et al. . |
| 4,763,674 | 8/1988 | Lelah . |
| 4,767,605 | 8/1988 | Lindbauer et al. . |
| 4,797,318 | 1/1989 | Brooker et al. . |
| 4,815,092 | 3/1989 | Chartier . |
| 4,855,276 | 8/1989 | Osborne et al. . |
| 4,859,438 | 8/1989 | Lindbauer et al. . |
| 4,943,394 | 7/1990 | Lammertz et al. . |
| 4,963,166 | 10/1990 | Hoyt et al. . |
| 4,963,431 | 10/1990 | Goldstein et al. . |
| 5,059,405 | 10/1991 | Watson et al. . |
| 5,212,131 | 5/1993 | Belding . |
| 5,278,112 | 1/1994 | Klatte . |

\* cited by examiner

Fig-1

FIG_2

FIBER FILTER AND METHODS OF USE THEREOF

This application is a division of co-pending application U.S. Ser. No. 09/378,278 filed on Aug. 20, 1999, which is a division of U.S. Ser. No. 08/378,807 filed Jan. 27, 1995 which is now U.S. Pat. No. 5,942,323.

TECHNICAL FIELD

The present invention relates generally to a fiber filter and method for the removal of compounds having toxic or corrosive properties or disagreeable odors, especially sulfur containing compounds, from gaseous streams. The invention more particularly relates to the use of a fiber filter comprising an inert fiber matrix, water, and a substrate bound to the fiber matrix that is capable of oxidizing or neutralizing a contaminant. More specifically, the substrate bound to the fiber matrix is sodium bicarbonate, impregnated activated alumina, impregnated zeolite, or a mixture thereof. The impregnate is a permanganate salt, sodium bicarbonate, or a mixture thereof. The fiber filter of the present invention has a higher efficiency of removal of the above compounds from gas streams than the fiber filters of the prior art.

BACKGROUND OF THE INVENTION

Undesirable airborne compounds, including sulfur compounds, ammonia, formaldehyde, urea, carbon monoxide, oxides of nitrogen, mercaptans, amines, and ethylene, occur in a number of environments, where most are primarily responsible for the presence of disagreeable odors, or irritating or toxic gases. Such environments include petroleum treatment and storage areas, sewage treatment facilities, hospitals, morgues, anatomy laboratories, animal rooms, and pulp and paper production sites, among others. These undesirable compounds may be bacterial breakdown products of higher organic compounds, or by products of industrial processes.

Hydrogen sulfide ("$H_2S$"), a colorless, toxic gas with a characteristic odor of rotten eggs, is produced in coal pits, gas wells, sulfur springs, and from decaying organic matter containing sulfur. Controlling emissions of this gas, particularly from municipal sewage treatment plants, has long been considered desirable. More recently, protecting electronic apparatus from the corrosive fumes of these compounds has become increasingly important. Further, $H_2S$ is flammable.

Ammonia ("$NH_3$"), also a colorless gas, possesses a distinctive, pungent odor and is a corrosive, alkaline gas. The gas is produced in animal rooms and nurseries and its control also has long been considered desirable.

Chlorine ("$Cl_2$") is a greenish-yellow gas with a suffocating odor. The compound is used for bleaching fabrics, purifying water, treating iron, and other uses. Control of this powerful irritant is most desirable for the well-being, of those who work with it or are otherwise exposed to it. At lower levels, in combination with moisture, chlorine has a corrosive effect on electronic circuitry, stainless steel and the like.

Formaldehyde ("HCHO") is a colorless gas with a pungent suffocating odor. It is present in morgues and anatomy laboratories, and because it is intensely irritating to mucous membranes, its control is desirable.

Urea ("$CH_4N_2O$") is present in toilet exhaust and is used extensively in the paper industry to soften cellulose. Its odor makes control of this compound desirable.

Carbon monoxide ("CO"), an odorless, colorless, toxic gas, is present in compressed breathing air. Oxygenation requirements for certain atmospheres, including those inhabited by humans, mandate its control.

Oxides of nitrogen including nitrogen dioxide ("$NO_2$"), nitric oxide ("NO"), and nitrous oxide ("$N_2O$"), are compounds with differing characteristics and levels of danger to humans, with nitrous oxide being the least irritating oxide. Nitrogen dioxide, however, is a deadly poison. Control of pollution resulting from any of these oxides is desirable or necessary, depending on the oxide.

Mercaptans and amines, including methyl mercaptan ("$CH_3SH$"), butyl mercaptan ("$C_4H_9SH$") and methyl amine ("$CH_5N$"), are undesirable gases present in sewerage odor. The control of these gases is desired for odor control.

Ethylene ("$C_2H_4$") is a colorless, flammable gas that is a simple asphyxiant which accelerates the maturation or decomposition of fruits, vegetables, and flowers. Control of this compound prolongs the marketable life of such items.

Attempts have been made to provide fiber filters for the removal of the undesirable compounds from fluid streams. Desired features of such fiber filters are a high efficiency in removing the compound from an air stream contacting the fiber filter, and a high ignition temperature (non-flammability).

One specific example of a fiber filter for the removal of undesirable compounds from gas streams is the Odor Kontroller® line of filters available from Air-Kontrol, of Batesville, Miss. The Odor Kontroller® filters are non-woven polyester coated with crushed, activated carbon, which can be impregnated for removing reactive gases.

Air-Kontrol also markets a fiber filter specific for the removal of ammonia and ammonium compounds. This fiber filter is Zeo-Sorb Odor Kontroller®, which is non-woven polyester coated with crushed zeolite. The Air-Kontroller® filters are also available coated with an antimicrobial composition to remove organisms from an air stream.

Another example of a fiber filter is AAF-NWPE, available from LEWCOTT of Millbury, Mass. The AAF-NWPE fiber filter is non-woven polyester coated with activated alumina. Also available from LEAWCOTT is ZEF-NWPE, which is non-woven polyester coated with zeolite.

Although the above filters disclose non-woven polyester coated with activated carbon, zeolite, or activated alumina for the removal of undesirable compounds from fluid streams, this line of filters has a limited efficiency for the removal of undesired compounds.

Accordingly, although there are a few fiber filters known in the art for removing undesirable contaminants from fluid streams, as discussed above, these known fiber filters all have a limited efficiency for the removal of undesirable compounds from gas streams, and therefore have limitations and drawbacks in their use, and do not meet the needs of various industries.

Therefore, there remains a need in the art for a fiber filter that has a high efficiency for the removal of undesired compounds from a fluid stream. More particularly, there remains a need in the art for a fiber filter that has the capability of both absorbing or adsorbing an undesirable compound and neutralizing or oxidizing an undesirable compound. Further, this fiber filter needs to be of low flammability, long lasting, requiring fewer replacements, and thereby minimizing replacement and maintenance costs. Also needed is a high efficiency fiber filter which may be used in small filter beds, and therefore may allow the treatment of fluid streams where there are significant space limitations.

SUMMARY OF THE INVENTION

The present invention relates to a fiber filter, methods of preparing the same, and methods of treating a fluid stream with the fiber filter. More particularly, the fiber filter of the present invention comprises an inert fiber matrix, water, and a substrate bound to the fiber matrix that is capable of adsorbing or absorbing and oxidizing or neutralizing a contaminant.

The fiber filter of the present invention has a hither efficiency and capacity to remove certain undesired compounds from gaseous streams than do the fiber filters in the prior art.

The present invention addresses an existing need in the prior art by providing a high efficiency, low flammability fiber filter for the removal of undesirable contaminants from gas streams. The present invention therefore provides a long lasting fiber filter which needs to be replaced less frequently and therefore minimizes maintenance and replacement costs. Also provided by the fiber filter of the present invention is a high efficiency fiber filter which may be used in small filter beds, and therefore may allow the treatment of fluid streams where there are significant space limitations. The present invention further provides methods of making and using the fiber filter.

Generally described, the present invention provides a fiber filter which includes an inert fiber matrix, water, and a substrate bound to the fiber matrix that is capable of oxidizing or neutralizing a contaminant. More specifically, the substrate bound to the fiber matrix is sodium bicarbonate, impregnated activated alumina, impregnated zeolite, or a mixture thereof. The impregnate preferably is a permanganate salt, sodium bicarbonate, or a mixture thereof. The fiber matrix is inert to the impregnate, and preferably is a woven or nonwoven, synthetic fiber. The synthetic fiber may be polyester, fiber glass, steel wool, polypropylene, rayon, acetate, polyamide, nylon, or acrylic. Preferably the inert fiber matrix is nonwoven polyester ("NWPE").

In one embodiment of the present invention, the fiber filter of the present invention comprises potassium permanganate, sodium bicarbonate, activated alumina, water, and nonwoven polyester. More particularly, the fiber filter preferably comprises between approximately 1 and 20% potassium permanganate, 5 and 50% sodium bicarbonate, 5 and 50% activated alumina, 5 and 30% water, and 5 and 75% nonwoven polyester, wherein the above percentages are by weight of the composition. In another embodiment, zeolite man be substituted for the activated alumina in the above composition.

In yet another embodiment of the present invention, the fiber filter comprises potassium permanganate, activated alumina, water, and nonwoven polyester. More particularly, the fiber filter preferably comprises between approximately 1 and 20% potassium permanganate, 5 and 75% activated alumina, 5 and 30% water, and 5 and 75% nonwoven polyester, wherein the above percentages are by weight of the composition. In another embodiment, zeolite may be substituted for activated alumina in the above composition.

The present invention also provides a method of preparing the fiber filter of the present invention. This method comprises the step of affixing a substrate to an inert fiber matrix, wherein the substrate is capable of oxidizing or neutralizing a contaminant. The substrate may be sodium bicarbonate, impregnated activated alumina, or impregnated zeolite. The substrate may be impregnated before or after the substrate is affixed to the fiber matrix.

Preferably, the method of the present invention comprises the step of impregnating a substrate coated fiber matrix with an aqueous impregnate solution, and drying the resultant fiber filter until the concentration of water is between approximately 5 and 30%, and the proportion of the fiber matrix material is between approximately 5 and 75%, by weight of the composition. Preferably, the impregnate solution contains up to approximately 25% of an impregnate.

In an alternative aspect of the invention, the method of the present invention comprises the steps of mixing an impregnate with water to form an impregnate solution, affixing a substrate to an inert fiber matrix, impregnating the substrate with the impregnate solution either before or after it is affixed to the fiber matrix, and drying the resultant filter fiber as discussed above.

Yet another aspect of the present invention is a method of treating a contaminated fluid stream with the fiber filter of the present invention. This method comprises contacting the contaminated fluid stream with the fiber filter of the present invention.

The fiber filter embodying the present invention, the method of its preparation, and the method of its use provide improved efficiency and capacity in removing contaminants from gas streams.

Accordingly, it is an object of the present invention to provide a fiber filter for removing undesirable compounds from an air stream.

It is another object of the present invention to provide a fiber filter having a high efficiency in removing unwanted compounds from an air stream flowing through the filter.

It is yet another object of the present invention to provide a fiber filter having a high ignition temperature, and therefore, limited flammability.

It is also an object of the present invention to provide a fiber filter that is inexpensive to manufacture and use.

It is a further object of the present invention to provide a fiber filter having a high total capacity for the removal of an undesirable compound.

It is another object to provide an fiber filter so efficient and having such a high capacity for removing undesirable compounds that less fiber filter needs to be utilized, therefore allowing the use of smaller air filtration units.

It is yet another object to provide a method of making a fiber filter having a high efficiency and a high total capacity for the removal of an undesirable compound.

It is a further object to provide a method of treating a contaminated air or gas stream with a fiber filter.

These and other objects, features and advantages of the present invention will become apparent after a review of the following detailed description of the disclosed embodiments and the appended claims.

DETAILED DESCRIPTION OF THE INVENTION

The present invention relates to a fiber filter, method of preparing the same, and method of treating a fluid stream with the fiber filter. More particularly, the fiber filter of the present invention comprises an inert fiber matrix, water, and a substrate bound to the fiber matrix that is capable of oxidizing or neutralizing a contaminant, along with adsorbing or absorbing a contaminant. An improved efficiency of removal of compounds is achieved by this fiber filter. For example, a preferred embodiment of the fiber filter of the present invention has a higher efficiency for the removal of sulfur dioxide, and a higher efficiency for the removal of hydrogen sulfide than the fiber filters produced by the current art. (See FIGS. 1 and 2 which will be fully discussed below.)

Generally described, the present invention provides a fiber filter which includes an inert fiber matrix, water, and a substrate bound to the fiber matrix that is capable of oxidizing or neutralizing a contaminant.

Unless stated otherwise, percentages throughout the specification and claims are by weight of the composition.

Terms such as "fiber filter", and "matrix filtration composition" are interchangeable, and denote a filter comprising an inert fiber matrix. A fiber filter of the present invention also contains water, and a substrate bound to the fiber matrix which is capable of oxidizing or neutralizing an unwanted contaminant in a fluid stream by the contact of such a filter with the fluid stream, wherein the substrate is selected from the group consisting of impregnated activated alumina, impregnated zeolite, and sodium bicarbonate. It is to be understood that the term "fluid" is defined as a liquid or gas capable of flowing, and includes gaseous, aqueous, organic containing, and inorganic containing fluids.

Also, terms such as "fiber matrix", "inert fiber matrix", and "filter matrix" are all interchangeable, and denote a plurality of interconnected synthetic fibers, woven or nonwoven. The synthetic fibers used in the present invention are selected such that the synthetic fibers do not react with the impregnates or substrates used in the present invention.

The terms "contaminant", "undesired contaminant", and "undesired compound" are interchangeable, and denote a fluid-born compound that is undesirable because it is malordorous, irritating, or toxic, according to the location and use of the fluid stream. Examples of such contaminants, include, but are not limited to, the compounds discussed above.

The fiber matrix of the present invention is inert to the impregnate and substrate, and is comprised of a woven or nonwoven, synthetic fiber. Accordingly, any fiber matrix known in the art that is inert to the impregnate and substrate can be used in the present invention. Examples of such a synthetic fiber include, but are not limited to, polyester, fiber glass, steel wool, polypropylene, rayon, acetate, polyamide, nylon, or acrylic. A preferred fiber matrix is comprised of polyester. More preferably, the fiber matrix is comprised of nonwoven polyester.

The size and shape of the fiber matrix, and hence the fiber filter of the present invention, is not critical to the present invention. The present invention includes any filter size, and therefore fiber matrix size, appropriate for air handling units, such as an HVAC unit, used in residences, commercially, or industrially. The size of the fiber matrix used in the present invention may also vary according to the identity and quantity of the substrate(s) to be bound to the fiber matrix, the identity and quantity of the other constituents that will be in the fiber filter, the intended use of the fiber filter, the environmental conditions where the fiber filter will be used, and the desired dimensions of the fiber filter produced by the present invention. The amount of fiber matrix material in the fiber filter of the present invention is between approximately 5 and 75%, and preferably is between 15 and 25%. More preferably, the proportion of the fiber matrix material is approximately 20%. It is to be understood that these amounts, and the amounts throughout the specification and claims referring to the concentration of fiber matrix in the fiber filter, includes the weight of the binder used to affix or bind the substrate to the fiber matrix.

The amount of water in the fiber filter of the present invention is between approximately 5 and 30%, and is preferably between 10 and 25%. More preferably, the concentration of water is between approximately 15 and 20%. The water may be added to the fiber filter during the process of making the fiber filter, as described below. The water in the fiber filter may also be obtained by the conditions present, such as the humidity and the temperature, during the fiber filter's storage and use.

It is to be understood that when referring to the relative weight of components, the water referred to in the present specification, examples, and tables is defined as the free water, and does not include the bound water in the substrate. Free water is driven off by an oven at approximately 200° F., but if left in the substrate it is available for the oxidation reaction. In contrast, the bound water functions by holding the substrate together, and bound water is not driven out or evaporated except when in a kiln at 1800 to 2000° F. Bound water is not available for reaction with the undesirable contaminants. Also, one of ordinary skill in the art will understand that the concentration of free water in the fiber filter may be altered by the conditions present, such as the humidity and the temperature, during, the fiber filter's storage and use.

The substrate bound to the fiber matrix is activated alumina ("$Al_2O_3$") (LaRoche Chemical, Baton Rouge, La.), zeolite (Steel Head Specialty Minerals, Spokane, Wash.), sodium bicarbonate ("$NaHCO_3$") (Rhone-Poulenc, Chicago Heights, Ill.), or a mixture thereof. Preferably, the substrate is between approximately −50 mesh to −325 mesh. More preferably, the substrate is approximately −325 mesh. A preferred substrate is activated alumina.

The substrate can be bound to the fiber matrix of the present invention by any binder known in the art that effectively binds the substrate to the fiber matrix, that is inert to the impregnate, and that does not substantially reduce the surface area of the substrate available to react with unwanted contaminants in the fluid stream thereby diminishing the efficiency of the fiber filter. The amount of binder to be used is the amount effective to affix or bind the substrate to the fiber matrix.

In the embodiment wherein the fiber filter of the present invention is comprised of sodium bicarbonate and either activated alumina or zeolite, with or without potassium permanganate, it is preferred that the activated alumina or zeolite be bound to the fiber matrix and the sodium bicarbonate be impregnated into the activated alumina or zeolite.

The concentration of a substrate in the fiber filter of the present invention is between approximately 5 and 90%. Preferably, the concentration of a substrate in the fiber filter is between 5 and 75%, and more preferably it is between 5 and 50%. The preferred concentrations of the substrate in the fiber filter varies according to the identity of the substrate, the identity of the other constituents in the fiber filter, the intended use of the fiber filter, the environmental conditions where the fiber will be used, and the dimensions of the fiber filter.

For example, where the fiber filter contains potassium permanganate, sodium bicarbonate, and either activated alumnina or zeolite, the preferred amount of activated alumina or zeolite is between approximately 5 and 50%, more preferably is between approximately 20 and 30%, and most preferably is approximately 25%. In this embodiment, the preferred amount of sodium bicarbonate in the fiber filter is between approximately 5 and 50%, more preferably is between approximately 20 and 30%, and most preferably is approximately 25%. The sodium bicarbonate in this embodiment may be a substrate, an impregnate, or a mixture thereof.

Where the fiber filter contains potassium permanganate, and either activated alumina or zeolite, the preferred amount of activated alumina or zeolite is between approximately 5 and 75%, more preferably is between approximately 20 and 60%, and most preferably is approximately 50%. Where the fiber filter contains sodium bicarbonate, and either activated alumina or zeolite, the preferred amount of activated alumina or zeolite is between approximately 5 and 75%, more preferably is between approximately 20 and 60%, and most preferably is approximately 30%. In this embodiment, the preferred amount of sodium bicarbonate in the fiber filter is between approximately 5 and 75%, more preferably is between approximately 10 and 50%, and most preferably is approximately 30%. The sodium bicarbonate in this embodiment may be a substrate, an impregnate, or a mixture thereof.

Where the fiber filter contains sodium bicarbonate, and does not contain activated alumina or zeolite, and does not contain any permanganate salt impregnate, the preferred amount of activated sodium bicarbonate is between approximately 5 and 90%, more preferably is between approximately 50 and 70%, and most preferably is approximately 65%. It is to be understood that all of the above fiber filters also contain between approximately 5 and 30% water, and between approximately 5 and 75% fiber matrix.

In one embodiment of the invention, activated alumina or zeolite coated nonwoven polyester can be obtained from LEWCOTT, of Millbury. Mass., and then impregnated with the desired impregnate. More particularly. LEWCOTT manufactures a product. "AAF-NWPE". which is nonwoven polyester coated with activated alumina in various dimensions, and having various amounts of activated alumina thereon. By way of example only, the product AAF-NWPE may be purchased in ¼ inch thickness, 24 inch wide, and 26 inch diameter rolls. Also, the product may be purchased wherein the ratio of nonwoven polyester to activated alumina is from 1:0.5 to 1:3, by to weight. LEWCOTT also manufactures a product, "ZEF-NWPE", which is nonwoven polyester coated with zeolite, in the dimensions and ratios of zeolite to nonwoven polyester as discussed above for the AAF-NWPE product.

The impregnate of the activated alumina or the zeolite is a permanganate salt, sodium bicarbonate, or a mixture thereof. The permanganate salt may be selected from the group consisting of, but not limited to, potassium permanganate ("$KMnO_4$"), sodium permanganate, magnesium permanganate, calcium permanganate, barium permanganate, and lithium permanganate. Preferably, the permanganate salt is potassium permanganate (Aldrich, Milwaukee, Wiss.). The concentration of the permanganate salt in the fiber filter is between approximately 1 and 20%, and is preferably between 5 and 15%. More preferably, the concentration of the permanganate salt is approximately 10%. The preferred concentrations of the permanganate salt do not change if another impregnate, namely sodium bicarbonate, is present in the fiber filter of the present invention.

Where sodium bicarbonate is an impregnate, the concentration of the sodium bicarbonate in the fiber filter of the present invention is between approximately 5 and 75%, preferably between 10 and 50%, and more preferably is approximately 30%. Where sodium bicarbonate and a permanganate salt are both impregnates in the fiber filter of the present invention, the concentration of the sodium bicarbonate is between approximately 5 and 50%, preferably between 20 and 30%, and more preferably is approximately 25%.

It is to be understood that the term permanganate in the present specification, examples, and tables represents the permanganate salt, not the permanganate ion ($MO_4^-$). Therefore, the percent ranges of permanganates in compositions in the present specification denote the percent of the permanganate salt in the composition, not the percent of the permanganate ion in the composition.

As stated above, the fiber filter of the present invention differs from the fiber filters known in the art in that the fiber filter of the present invention has a higher efficiency to remove certain undesired compounds from gaseous streams The fiber filter of the present invention has the capability of oxidizing and/or neutralizing contaminants. The following is an example of an oxidizing system in the fiber filter of the present invention. Activated alumina ("$Al_2O_3$") impregnated with potassium permanganate ("$KMnO_4$") provides air purification and odor control by both adsorbing and/or absorbing odors, and then destroying the collected odors by the potassium permanganate's controlled oxidizing action. Apparently, the permanganate destroys odors by the following oxidation reactions:

$MnO_4^- + 8H^+ + 5e^- \rightarrow Mn^{+2} + 4H_2O$ (acid)

$3MnO_4^- + 2H_2O \rightarrow MnO_2 + 2MnO_4 + 4OH$ (alkaline)

$MnO_4^- + 2H_2O + 3e^- \rightarrow MnO_2 + 2H_2O$ (neutral)

Because the permanganate will not ionize to release the active permanganate ion unless water is present, the substrate must be hydrophilic and contain water, or the reaction must take place in normal ambient humidity.

In one embodiment of the present invention, the fiber filter of the present invention comprises potassium permanganate, sodium bicarbonate, activated alumina, water, and nonwoven polyester. More particularly, the fiber filter preferably comprises between approximately 1 and 20% potassium permanganate, 5 and 50% sodium bicarbonate. 5 and 50% activated alumina, 5 and 30% water, and between approximately 5 and 75% nonwoven polyester. More preferably, the fiber filter comprises between approximately 5 and 15% potassium permanganate, 20 and 30% sodium bicarbonate, 20 and 30% activated alumina, 10 and 25% water, and between approximately 15 and 25% nonwoven polyester. Most preferably, the fiber filter is comprised of approximately 10% potassium permanganate, 25% sodium bicarbonate, 25% activated alumina, 20% water, and 20% nonwoven polyester. In another embodiment the activated alumina may be replaced with zeolite in the above compositions.

In yet another embodiment of the present invention, the fiber filter comprises potassium permanganate, activated alumina, water, and nonwoven polyester. More particularly, the fiber filter preferably comprises between approximately 1 and 20% potassium permanganate, 5 and 75% activated alumina, 5 and 30% water, and between approximately 5 and 75% nonwoven polyester. More preferably, the fiber filter comprises between approximately 5 and 15% potassium permanganate, 20 and 60% activated alumina, 10 and 25% water, and between approximately 15 and 25% nonwoven polyester. Most preferably, the fiber filter comprises approximately 10% potassium permanganate, 50% activated alumina, 20% water, and 20% nonwoven polyester. In another embodiment, the activated alumina may be replaced with zeolite in the above compositions.

In yet another embodiment of the present invention, the fiber filter comprises sodium bicarbonate, activated alumina, water, and nonwoven polyester. More particularly, the fiber filter preferably comprises between approximately 5 and 75% sodium bicarbonate, 5 and 75% activated alumina, 5 and 30% water, and between approximately 5 and 75% nonwoven polyester. More preferably, the fiber filter comprises between approximately 10 and 50%G sodium bicarbonate, 20 and 60% activated alumina. 10 and 25% water and between approximately 15 and 25% nonwoven polyester. Most preferably the fiber filter comprises approximately 30% sodium bicarbonate, 30% activated alumina. 20% water, and 20% nonwoven polyester. In another embodiment, the activated alumina may be replaced with zeolite in the above compositions.

In still another embodiment, the fiber filter of the present invention comprises sodium bicarbonate, water, and nonwoven polyester. More particularly, the fiber filter preferably comprises between approximately 5 and 90% sodium bicarbonate, 5 and 30% water, and 5 and 75% nonwoven polyester. More preferably, the fiber filter comprises between approximately 50 and 70% sodium bicarbonate, 10 and 25% water, and 15 and 25% nonwoven polyester. Most preferably, the fiber filter comprises approximately 65% sodium bicarbonate, 15% water, and 20% nonwoven polyester.

Methods of Preparing the Fiber Filter of the Present Invention

The present invention also provides a method of preparing the fiber filter of the present invention. This method comprises the step of affixing a substrate to an inert fiber matrix, wherein the substrate is capable, or is rendered capable, of oxidizing or neutralizing a contaminant. As stated above, the substrate may be sodium bicarbonate, impregnated activated alumina, or impregnated zeolite. The activated alumina or zeolite may be impregnated with an impregnate solution before or after it is affixed to the fiber matrix. Preferably, the activated alumina or zeolite is impregnated after it is affixed to the fiber matrix.

It is to be understood that sodium bicarbonate may be a substrate affixed to the fiber matrix, an impregnate in the impregnate solution, or both in the method of preparing the fiber filter of the present invention. As stated above, where sodium bicarbonate and activated alumina or zeolite are present in the fiber filter of the present invention, the sodium bicarbonate is preferably impregnated into the activated alumina or zeolite. Where the sodium bicarbonate is a substrate, or impregnate, or both, any concentration of sodium bicarbonate in the substrate and/or the aqueous impregnate solution which is effective to produce the composition of the present invention man be used.

Although not wanting to be limited by the following theory, it is believed that the sodium bicarbonate enhances the retention of water in the fiber filter of the present invention. Also, it is believed that sodium bicarbonate in contact with certain airborne contaminants is capable of neutralizing the contaminants, and therefore need not be impregnated with an impregnate capable of oxidizing or neutralizing the contaminant. Accordingly, in discussions in the specification referring to an impregnated substrate or the method of impregnating a substrate, the substrate referred to is generally activated alumina or zeolite.

The method of the present invention preferably comprises the step of impregnating a substrate coated fiber matrix with an aqueous impregnate solution, and drying the resultant fiber filter until the concentration of water is between approximately 5 and 30%, and the concentration of the fiber matrix is between approximately 5 and 75%, by weight of the composition. As stated above, LEWCOTT of Millbury, Mass. commercially provides substrate coated fiber matrix products such as AAF-NWPE and ZEF-NWPE, which are activated alumina or zeolite coated nonwoven polyester, respectively. Preferably, the ratio of the weight of the substrate to the weight of the fiber matrix is between approximately 0.5:1 to 3:1.

Preferably, the aqueous impregnate solution contains up to approximately 25% of an impregnate. It is to be understood that more than one impregnate may be present in the impregnate solution, and that the solution may contain up to 25% of each of the impregnates. More preferably, the concentration of each impregnate is between approximately 10 and 20%. Even more preferably, the concentration of each impregnate is approximately 15%. To dissolve and maintain a high concentration of impregnate in solution, the aqueous solution should be heated to approximately 160° to 200° F. and preferably to between approximately t70 and 190° F. and most preferably is at approximately 180° F. Lower temperatures man be used or impregnate concentrations of less than approximately 15%.

It is to be understood that the concentration of the impregnate solution is not critical to the present invention. Where a lower concentration of impregnate is used, more of the impregnate solution is applied to the substrate coated fiber matrix. Where a higher concentration of impregnate is used, less impregnate solution is applied to the substrate coated fiber matrix. In embodiments where the substrate coated fiber matrix is soaked in impregnate solution, then the soaking time will be longer where a lower concentration impregnate solution is present, and the soaking time will be shorter where a higher concentration impregnate solution is present. Therefore, any concentration of permanganate in the aqueous solution which is effective to yield the composition of the present invention may be used.

The method of impregnating the substrate coated fiber matrix in accordance with the present invention has not been found to be critical. Impregnation may be carried out simply by immersing and soaking the fiber matrix coated with substrate in a volume of impregnate solution. Also, the impregnate solution may be passed through the fiber matrix coated with substrate rather than being used as a static immersion treatment. In another embodiment, the fiber matrix coated with substrate could be passed through a volume (bath) of impregnate solution. in any of the above embodiments, the length of time that the coated fiber matrix is in contact with the impregnate solution is the length of time needed for the substrate on the fiber matrix to be uniformly impregnated. Further, the fiber matrix coated with substrate may be sprayed with the impregnate solution.

By way of example only, 24" wide, ⅛ to ¼" thick. 100 yard long pieces of substrate coated nonwoven polyester may be obtained from LEWCOTT. Generally, such a large piece is configured in a large roll. The entire roll of coated nonwoven polyester may be submersed in impregnate solution, or it may be unrolled and pulled through an impregnate bath or sprayed with the impregnate solution.

After dipping, soaking, rolling, spraying, or otherwise applying the impregnate solution onto the substrate coated fiber matrix, the treated fiber matrix may optionally be passed through one or more wringers to remove excess moisture. Other methods of impregnation would suggest themselves as equally appropriate, and these are included within the scope of the present invention.

The method of drying the substrate coated fiber matrix after impregnation has not been found to be critical to the present invention. Accordingly, any method known in the art may be used as long as the temperature does not exceed approximately 205° F. In one embodiment, the impregnated coated fiber matrix is merely air dried until the desired water content of between approximately 5 and 30% is reached. To minimize drying time, the impregnated coated fiber matrix may be heated at a temperature of between approximately 90 to 205° F. A preferred drying temperature is approximately 130° F. The impregnated coated fiber matrix may also be suspended, or if it is configured in a large roll it may be unrolled, to minimize drying time.

It has been found that no particular configuration of the fiber filter of the present invention is critical to the present invention. Accordingly, the thickness, length, and width of the fiber filter is dictated by its use. The fiber filter may be cut into any desired size or shape such that it fits commercial, industrial, or residential air handling units. The fiber filter may also be folded, pleated, reinforced, or packaged by any means known in the art wherein the reinforcing and packaging material is nonreactive with the impregnate, substrate, or fiber matrix.

In another embodiment, the method of making the fiber filter of the present invention comprises the steps of binding or affixing one or more substrates to a fiber matrix, impregnating the substrate(s) affixed to the fiber matrix and then drying, the resultant fiber filter until the water concentration is between approximately 5 and 30%, and the fiber matrix is between approximately 5 and 75%. The methods of impregnating and drying as described above may be used in this embodiment of the invention.

Any method known in the art for effectively binding or affixing one or more substrates to a fiber matrix may be used in the present invention, wherein the substrate may still be impregnated (if it is activated alumina or zeolite), and wherein sufficient surface area of the substrate remains available to oxidize or neutralize a contaminant upon contact. In one embodiment, an aqueous slurry may be prepared comprising one or more substrates, and a binder. The slurry is then sprayed onto the fiber matrix, and the coated fiber matrix is then heated to set the binder and reduce the amount of moisture to a desired level. Preferably, the aqueous slurry would include between approximately 5 and 25% binder, and 75 and 95% substrate. More preferably, the aqueous slurry would include between approximately 10 and 20% binder, and 80 and 90% substrate. Most preferably, the aqueous slurry would include approximately 15% binder and 85% substrate. In the alternative to spraying the aqueous slurry, the fiber matrix could be dipped, soaked, or pulled through a bath of the aqueous slurry. The amount of aqueous slurry applied to the fiber matrix varies according to the desired amount of substrate on the fiber matrix, and also varies according to the concentration of the aqueous slurry. Preferably, the ratio of the dry weight of the fiber matrix to the dry weight of the substrate is between approximately 1:0.5 to 1:3.

In an alternative aspect of the invention, the method of the present invention comprises the steps of mixing an impregnate with water to form the aqueous impregnate solution discussed above, impregnating the substrate with the impregnate solution, drying the impregnated substrate to a desired water content, affixing the impregnated substrate to the fiber matrix and then drying the resultant fiber filter as discussed above.

Any method known to one of ordinary skill in the art may be used to mix impregnate with water to make an aqueous impregnate solution. In the alternative, an aqueous impregnate solution may be commercially obtained, and diluted to the appropriate concentration of impregnate if necessary. If a concentration of more than 15% of impregnate is desired, it is preferable to heat the solution to between approximately 160° to 200° F., more preferably to between approximately 170 and 190° F., and most preferably to approximately 180° F. to keep the impregnate in solution. Lower temperatures may be used for impregnate concentrations of less than approximately 15%.

The method of impregnating the substrate, or substrates, prior to binding the substrate to the fiber matrix is not critical to the present invention. The substrate may be sprayed, passed through, or soaked in the aqueous impregnate solution discussed above. The method of drying the impregnated substrate is also not critical to the present invention. Accordingly, any no method known in the art for drying could be used so long as the capacity of the impregnated substrate to oxidize or neutralize a contaminant is not compromised. For example, impregnated substrate could be air dried or heated to a temperature of between approximately 90 to 205° F. A preferred drying temperature to minimize drying time is approximately 130° F. Preferably, the impregnated substrate would be dried until it had a water content of between approximately 5 and 30%, and more preferably between approximately 10 and 25%. The methods of affixing the impregnated substrate and drying the impregnated substrate coated fiber matrix also are not critical to the present invention, and have been described above.

Method of Using the Fiber Filter of the Present Invention

Yet another aspect of the present invention is a method of treating a contaminated fluid stream with the fiber filter of the present invention. This method comprises contacting the contaminated fluid stream With the above described fiber filters. Methods of treating gaseous or other fluid streams are well known in the art. As the method of treating fluid streams is not critical to the present invention, any method known in the art for treating fluid streams with the fiber filter of the present invention may be used.

The fiber filter of the present invention is employed to remove undesired compounds from gas streams. The to concentration of these undesirable compounds in the gas streams is not considered critical to the process of the present invention, nor is the physical and chemical makeup of the gas stream from which it is desired to remove undesirable compositions considered critical. Also, the flow rate of the gas stream is not critical to the present invention. However, the preferred flow rate is between 10 and 750 ft./min., and most preferably is between 300 and 600 ft/min., flowing perpendicularly to the face of the filter. The preferred flow rates are merely a reflection of the flow rates commonly used in air handling units used in residential facilities, commercial facilities, or industrial facilities.

Typically, the contaminants will be removed from air, especially from air admixed with effluent gas streams from municipal waste treatment facilities, paper mills, petrochemical refining plants, morgues, hospitals, anatomy laboratories, and hotel facilities, and so forth. Other embodiments include the removal of contaminants from the air recirculating through or entering an automobile, dwelling, laboratory, hospital, hotel, convention center, high rise building, industrial facilities, and other commercial facilities.

Oxidizing conditions which may be important are generally that oxygen preferably be present in the gas stream being treated, at least in small amounts. This oxygen content is readily found in the gas stream, if air comprises a sufficient portion of the gas stream being treated. If oxygen is totally absent or present in insufficient amounts, oxygen may be independently introduced into the gas stream being treated. A number of factors affect the amount or oxygen which may be required for maximum removal of the contaminants in a gas stream in accordance with the present invention, including the concentration and absolute amount of compounds being removed from the gas stream being treated.

With respect to the amount of contaminant removed, it is believed that the following factors affect the process: the basic degree of attraction of the substrate for the compound; the identity and thickness of the fiber filter; the specific surface area of the substrate; the surface characteristics of the substrate; the amount of substrate present on the fiber filter; the identity of the impregnate of the substrate, if any; the amount of impregnate present; and the amount of water present.

The fiber filter of the present invention is appropriately used alone in filter beds for the removal of undesirable compounds. It is also appropriate, however, to use the fiber filter of the present invention in conjunction with filter beds containing other filtration media or filters, and also in no conjunction with mechanical or electrostatic filters. Any such additional filters may be placed either upstream (before the fiber filter of the present invention with respect to the effluent gas being treated) or downstream.

The above invention significantly increases the efficiency of fiber filters to remove certain undesired compounds from gaseous streams over the efficiency of fiber filters of the prior art. Therefore, the usable lifetime of the fiber filter of the present invention will be much longer than a currently available fiber filter. The extension of the lifetime of the fiber filter will significantly reduce consumers' and businesses' purchasing servicing, and installation costs. Also, the enhanced efficiency of the fiber filter allows for a new line of products which are compact versions of currently available units, but have the same performance as the larger, currently available units. The capability of creating significantly smaller filtration units is useful for providing efficacious air filtration in space-limited quarters which previously could not utilize the larger, currently available units.

Further, the fiber filter of the present invention is safe as it is not flammable, in contrast to carbon containing filtration products. This aspect of the present invention is significant to industries which manufacture or process flammable, fume producing materials, such as the petroleum industry.

As stated earlier, the fiber filter of the present invention has a higher efficiency for the removal of sulfur dioxide, and a higher efficiency for the removal of hydrogen sulfide than the fiber filters produced by the current art that do not oxidize or neutralize contaminants. More particularly, the results of filter efficacy tests comparing the fiber filters of the is prior art and the fiber filter of the present invention are shown in FIG. 1 and FIG. 2, and the method used to obtain these results are fully discussed in Example 4.

Generally described, the efficacy tests were performed by challenging a 36 $cm^2$ quantity of the fiber filter with 5 ppm hydrogen sulfide or sulfur dioxide gas in a tempered, humidified air stream at a constant flow rate of 30 liters per minute, and monitoring the concentration of the gas stream exiting the fiber filter with a colorimeter. The colorimeter used to produce the results in FIGS. 1 and 2 was an MDA Scientific 7100 Toxic Gas Monitor (Lincolnshire, Ill.).

Figure 1:
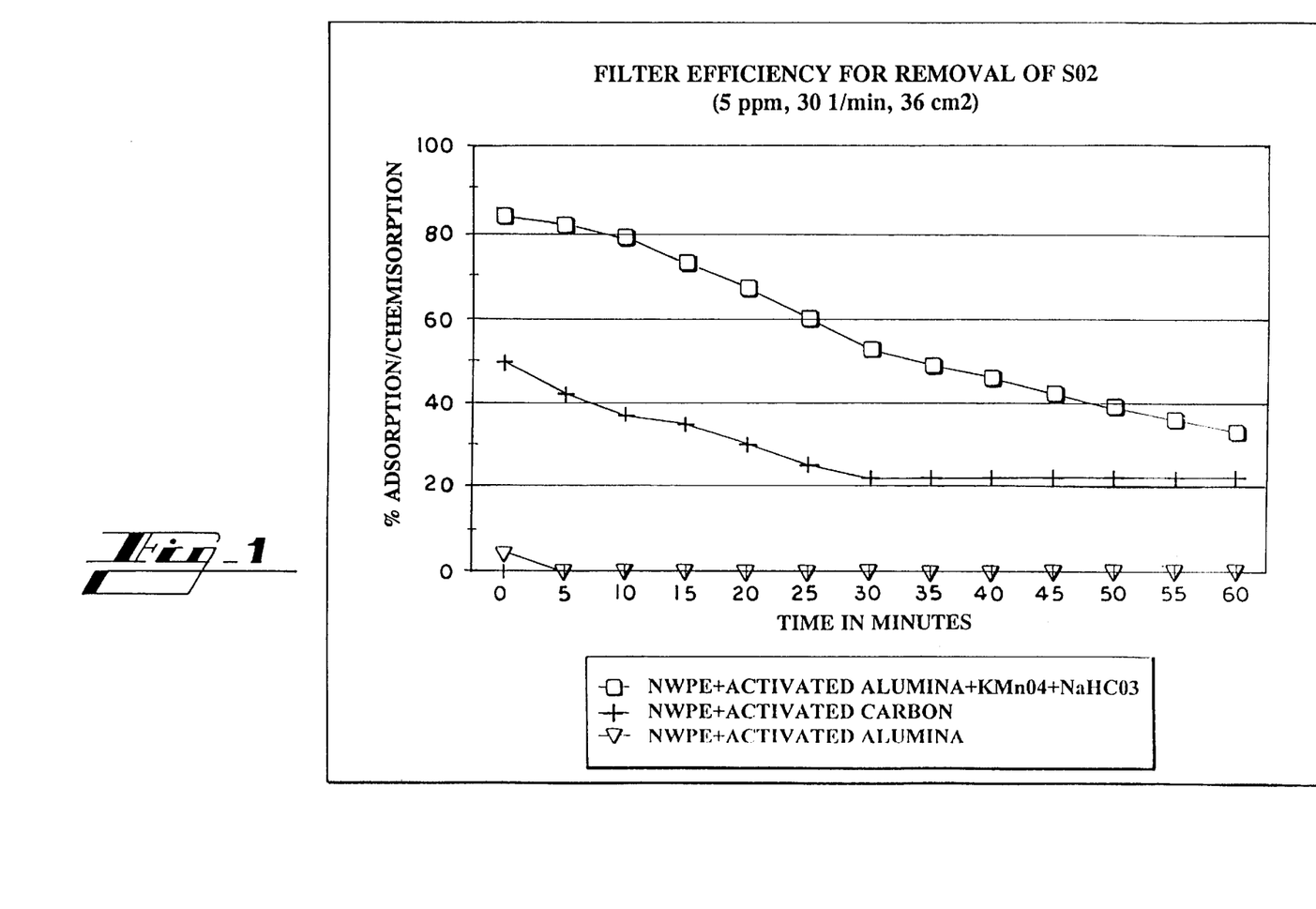
FIG. 1 is a graph comparing the efficiency of removal of sulfur dioxide by a fiber filter of the present invention with respect to fiber filters known in the art, as described more fully in Example 5.

FIG. 1 illustrates the filter efficiency for the removal of sodium dioxide from a gas stream. As can be seen in FIG. 1, the most effective filter was a fiber filter of the present invention, comprised of activated alumina, potassium permanganate, sodium bicarbonate, water, and nonwoven polyester. This fiber filter is fully described in Example 1. More particularly, the efficiency of a fiber filter of the present invention was approximately 84% at the beginning of the test, and was approximately 34% after sixty minutes. In contrast, one fiber filter of the prior art, comprised of activated carbon, water, and nonwoven polyester. had an efficiency of approximately 50% at the beginning of the test, and an efficiency or approximately 23% after sixty minutes. Further, the other fiber filter of the prior art, comprised of activated alumina, water, and nonwoven polyester, had an efficiency of approximately 4% at the beginning of the test, and an efficiency of approximately 0% after only five minutes. The fiber filters of the prior art are fully discussed in Example 2.

Figure 2:
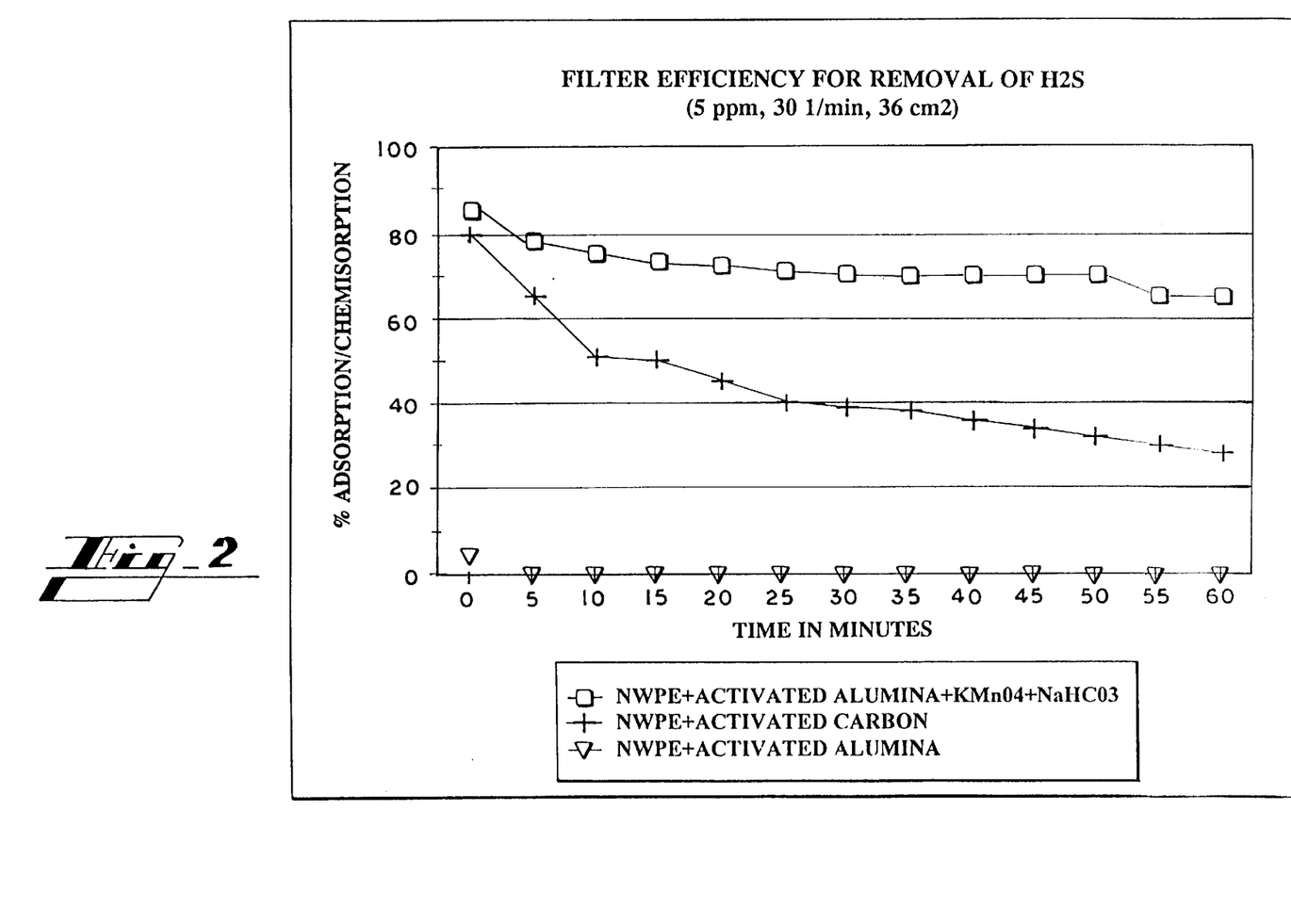
FIG. 2 is a graph comparing the efficiency of removal of hydrogen sulfide by a fiber filter of the present invention with respect to fiber filters known in the art, as described more fully in Example 6.

FIG. 2 illustrates the filter efficiency for the removal of hydrogen sulfide from a gas stream. The most effective filter to was a fiber filter of the present invention, comprised of activated alumina, potassium permanganate, sodium bicarbonate, water, and nonwoven polyester. More particularly, the efficiency of a fiber filter of the present invention was approximately 86%, at the beginning of the test, and was approximately 65% after sixty minutes. In contrast, one fiber filter of the prior art, comprised of activated carbon, water, and nonwoven polyester, had an efficiency of approximately 80% at the beginning of the test, and an efficiency of approximately 28% after sixty minutes. Further, the other fiber filter of the prior art, comprised of activated alumina, water, and nonwoven polyester, had an efficiency of approximately 4% at the beginning of the test, and an efficiency of approximately 0% after only five minutes.

Although the applicant does not know the precise mechanisms by which the substrate impregnated with permanganate operates, and is not bound by the following theory, it is believed that the oxidation reactions between the permanganate and the undesirable contaminants occur primarily near the surface of the activated alumina, rather than deep within its pores. Therefore it is important that the surface's oxidative capabilities be continually regenerated. It is believed that the oxidative capability of the surface of the activated alumina is regenerated by the flow or migration of permanganate from the center of the activated alumina to the surface of the activated alumina while the products of the oxidation reactions flow or migrate from the surface of the alumina to the center of the alumina. It is also believed that the hither the concentration of permanganate at the surface of the activated alumina, the higher the capacity and efficiency of the alumina. Further, the fluidity of the permanganate solution directly affects the flow and thus the quantity of the permanganate reaching the surface of the alumina. Therefore, it is important to maintain an elevated concentration of free water in the activated alumina so that the permanganate solution maintains a high level of fluidity and readily flows to the surface of the alumina thereby maximizing the efficiency of the fiber filter of the present invention.

Although the applicant does not know the precise mechanisms by which the substrate impregnated with sodium bicarbonate operates, and is not bound by the following theory, it is believed that neutralization reactions between the bicarbonate and the undesirable contaminants occur primarily near the surface of the activated alumina, rather than deep within its pores. It is believed that the sodium bicarbonate neutralizes acid gases, such as sulfur oxides and nitrogen oxides. More particularly, the neutralization reactions occurring between the bicarbonate and the contaminants are believed to be acid/base reactions known to those of ordinary skill in the art.

The following examples will serve better to illustrate the fiber filter, the treatment methods of the present invention, and the capacity for the removal of contaminants in gas streams produced thereby.

EXAMPLE 1

A Fiber Filter of the Present Invention is Prepared as Follows

A roll of AAF-NWPE (activated alumina coated on nonwoven polyester) is purchased from LEWCOTT of Millbury, Mass. The roll has the dimensions of 24 inches wide, ¼ inch thick, and 100 yards long. The ratio of nonwoven polyester to activated alumina is approximately 1:3. An impregnate solution is prepared by heating 500 ML of water to 180° F. while adding 100 grams of potassium permanganate and 100 grams of sodium bicarbonate. The impregnate solution formed has a concentration of about 20% potassium permanganate and 20% sodium bicarbonate.

A portion of the roll of AAF-NWPE having the dimensions of approximately 12"×12" was cut from the roll and immersed into the impregnate solution described above for approximately five minutes. The treated AAF-NWPE was then dried for about 60 minutes at approximately 100° F.

The method described above yields a fiber filter of the present invention having approximately the following composition:

25% nonwoven polyester
45% activated alumina
10% potassium permanganate
10% sodium bicarbonate
10% water.

EXAMPLE 2

Fiber Filters of the Prior Art

Fiber filters of the prior art were purchased from LEWCOTT of Millbury, Mass. More particularly, a roll of AAF-NWPE (activated alumina coated on nonwoven polyester) was purchased from LEWCOTT of Millbury, Mass. The roll has the dimensions of 24 inches wide, ¼ inch thick, and 100 yards long. The composition of this fiber filter, designated as "NWPE+activated alumina" in FIGS. 1 and 2, is approximately as follows:

30% nonwoven polyester
60% activated alumina
10% water

A 24"×24"×1" filter of Odor Kontroller® (activated carbon coated on nonwoven polyester) was purchased from Air-Kontrol of Batesville, Miss. The composition of this fiber filter, designated as "NWPE+activated carbon" in FIGS. 1 and 2 is approximately as follows:

30% nonwoven polyester
60% activated carbon
10% water

EXAMPLE 3

Compositions of the Fiber Filter of the Present Invention

Using the method described in Example 1, the following fiber filters may also be prepared, wherein ZEF-NWPE (nonwoven polyester coated with zeolite) may be substituted for AAF-NWPE in Example 1, and wherein the impregnate solution may contain zero, one, or two impregnates:

TABLE I

Composition of Fiber Filters (Percent by weight)

| Substrate | Substrate | NaHCO$_3$ | H$_2$O | KMnO$_4$ | NWPE |
|---|---|---|---|---|---|
| Alumina | 25 | 25 | 20 | 10 | 20 |
| Alumina | 50 |    | 20 | 10 | 20 |
| Alumina | 30 | 30 | 20 |    | 20 |
| Zeolite | 25 | 25 | 20 | 10 | 20 |
| Zeolite | 50 |    | 20 | 10 | 20 |
| Zeolite | 30 | 30 | 20 |    | 20 |
| Sodium Bicarbonate | 65 |    | 15 |    | 20 |

The fiber filters produced are suitable for placement in residential, commercial, and industrial air handling units. They provide an efficient fiber filter for the reduction or elimination of many undesirable compounds in fluid streams

EXAMPLE 4

Standard Test Method For Determination of Performance Characteristics of Nonwoven Polyester Fiber Filters The following is a method of determining the performance characteristics (removal efficiency) of nonwoven polyester fiber filters when subjected to flowing gas streams of known concentrations and velocities. This test provides a basis for comparing the characteristics of different fiber filters.

Generally described, the removal efficiency tests were performed by challenging a 36 cm$^2$ piece of fiber filter with 5 ppm hydrogen sulfide or sulfur dioxide gas in a tempered, humidified air stream at a constant flow rate of 30 liters per minute, and monitoring the concentration of the gas stream exiting the fiber filter with a calorimeter. The calorimeter used to produce the results was an MDA Scientific 7100 Toxic Gas Monitor.

More particularly, the 36 cm$^2$ sample is placed in a holding device and an air stream having a known concentration of contaminant is passed through the sample and then the concentration of the contaminant is measured. The tests can be run until a fiber filter is exhausted, to a predetermined period of time, or to a predetermined removal efficiency. In the following Examples, the test was run for the predetermined period of time of sixty minutes.

As stated above, the air utilized must be tempered, humidified, clean, oil-free, and compressed. Accordingly, the air must be passed through a bed of activated carbon followed by a filter bed containing potassium permanganate impregnated alumina pellets. Each filter bed should contain at least 300 ml. (18.3 cu. in.) of media for each liter per minute (0.035 cfm.) of air flow.

Leaks in the gas system should be checked for and eliminated before beginning the analysis of the fiber filters. Also, rotameters, analyzers, recorders, etc. should be calibrated over appropriate ranges according to the manufacturer's instructions or other standard methods, before any fiber filter is introduced into the system. Air and gas flow requirements should be determined and checked against supply capabilities to assure proper air and gas flows to the system.

With the air/gas lines disconnected from the lines leading to the fiber filter sample, turn on the air and adjust the rotameters and the flow meters to give the desired flow rates. Next, turn on the challenge gas and set the delivery pressure to approximately five pounds above the system air pressure. Adjust to the desired concentration of the contaminant gas in the air stream by increasing or decreasing the flow through the rotameter/flow meter and verify the concentration with the appropriate analyzer. If a multiple gas challenge is being used, each gas challenge concentration should be set separately before combining the flows. Interferences, both in the gas stream and on the analyzers, caused by the combining of multiple gases should be determined beforehand. The sample selector of the gas analyzer may be set for sampling at predetermined intervals and durations.

The air/gas lines are then connected to the lines leading to the fiber filter sample. Purified and humidified air is then mixed with the predetermined quantity of contaminant gas, and then the mixture passes through the fiber filter sample and is then analyzed by a calorimeter. At predetermined sampling intervals, record the outlet gas concentrations.

Obtain the time and outlet gas concentration data, and calculate the removal efficiency according to the following equation, wherein the removal efficiency is expressed as the percent of removal over time:

$$\text{REMOVAL EFFICIENCY }(\%)=((C1_t-C2_t)\times 100)/C1_t$$

where $C1_t$=input gas concentration (in ppm) at time "t."
$C2_t$=outlet gas concentration (in ppm) at time "t."

EXAMPLE 5

Removal Efficiency of Nonwoven Polyester Fiber Filters for Sulfur Dioxide

The results of removal efficiency tests comparing the efficiency of removal of sulfur dioxide by nonwoven polyester fiber filters of the prior art and of a nonwoven polyester fiber filter of the present invention are illustrated in FIG. 1. The efficiency tests were performed as described in Example 4, wherein the nonwoven polyester fiber filters described in to Example 1 (a fiber filter of the present invention) and Example 2 (fiber filters of the prior art) were analyzed.

FIG. 1 illustrates the filter efficiency for the removal of sodium dioxide from a gas stream. As can be seen from FIG. 1, the most effective filter was a fiber filter of the present invention, comprised of activated alumina, potassium permanganate, sodium bicarbonate, water, and nonwoven polyester as described in Example 1. More particularly, the efficiency of the fiber filter of the present invention was approximately 84% at the beginning of the test, and was no approximately 34% after sixty minutes. In contrast, one fiber filter of the prior art, comprised of activated carbon, water, and nonwoven polyester, had an efficiency of approximately 50% at the beginning of the test, and an efficiency of approximately 23% after sixty minutes. Further, the other fiber filter of the prior art, comprised of activated alumina, water, and nonwoven polyester, had an efficiency of approximately 4% at the beginning of the test, and an efficiency of approximately 0% after only five minutes.

EXAMPLE 6

Removal Efficiency of Nonwoven Polyester Fiber Filters for Hydrogen Sulfide

The results of removal efficiency tests comparing the efficiency of removal of hydrogen sulfide by nonwoven polyester fiber filters of the prior art and of a nonwoven polyester fiber filter of the present invention are illustrated in FIG. 2. The efficiency tests were performed as described in Example 4. wherein the nonwoven polyester fiber filters described in Example 1 (a fiber filter of the present invention) and Example 2 (fiber filters of the prior art) were analyzed.

FIG. 2 illustrates the filter efficiency for the removal of hydrogen sulfide from a gas stream. As can be seen from FIG. 2, the most effective filter was a fiber filter of the present invention, comprised of activated alumina, potassium permanganate, sodium bicarbonate, water, and nonwoven polyester. More particularly, the efficiency of the fiber filter of the present invention was approximately 86% at the beginning of the test, and was approximately 65% after sixty minutes. In contrast, one fiber filter of the prior art, comprised of activated carbon, water, and nonwoven polyester, had an efficiency of approximately 80% at the beginning of the test, and an efficiency of approximately 28% after sixty minutes. Further, the other fiber filter of the prior art, comprised of activated alumina, water, and nonwoven polyester, had an efficiency of approximately 4% at the beginning of the test, and an efficiency of approximately 0% after only five minutes.

The invention having been fully described by the above-detailed description and accompanying examples, other variations of, and uses for the present invention will become apparent to one skilled in the art. All such variations and uses are intended to be encompassed by the appended claims.

What is claimed is:

1. A method of making a fiber filter, comprising:

(a) impregnating a substrate coated fiber matrix with an aqueous impregnate solution; and (b) drying the resultant fiber filter until the concentration of water is between approximately 5 and 30%, and the concentration of the fiber matrix is between approximately 5 and 75%, by weight of the fiber filter;

wherein the impregnate is a mixture of a permanganate salt and sodium bicarbonate, wherein the substrate is selected from the group consisting of activated alumina and zeolite, and wherein the fiber matrix is inert to the impregnate.

2. The method of claim 1, wherein the impregnate solution is comprised of up to approximately 25% by weight of the fiber filter of an impregnate.

3. The method of claim 1, wherein the fiber matrix is a woven or nonwoven, synthetic fiber.

4. The method of claim 3, wherein the synthetic fiber is selected from the group consisting of polyester, fiberglass, steel wool, polypropylene, rayon, acetate, polyamides, nylon, and acrylics.

5. The method of claim 1, wherein the fiber matrix is nonwoven polyester.

6. The method of claim 1, wherein the permanganate salt is selected from the group consisting of potassium permanganate, sodium permanganate, magnesium permanganate, calcium permanganate, barium permanganate, and lithium permanganate.

7. The method of claim 1, wherein the permanganate salt is potassium permanganate.

* * * * *